United States Patent
Wang et al.

(10) Patent No.: US 8,414,037 B2
(45) Date of Patent: Apr. 9, 2013

(54) ELECTRONIC DEVICE WITH PUSH-PUSH TYPE LATCH MECHANISM

(75) Inventors: Wei-Cheng Wang, Taipei (TW); Wen-Chieh Liao, Guanyin Township, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 306 days.

(21) Appl. No.: 12/588,482

(22) Filed: Oct. 16, 2009

(65) Prior Publication Data

US 2011/0018288 A1    Jan. 27, 2011

(30) Foreign Application Priority Data

Jul. 27, 2009   (TW) .............................. 98213734 U (51) Int. Cl.
    *E05C 1/08* (2006.01)
(52) U.S. Cl.
    USPC ..... 292/163; 292/137; 292/DIG. 4; 292/DIG. 37; 292/DIG. 57; 292/341.11; 361/679.57; 361/679.58
(58) Field of Classification Search .............. 292/8, 27, 292/37, 124, 98, 169, 140, 300, 302, 303, 292/332–334, 341.15, DIG. 4, DIG. 37, DIG. 57; 361/679.57, 679.58
See application file for complete search history.

(56) References Cited

U.S. PATENT DOCUMENTS

| | | | | |
|---|---|---|---|---|
| 3,762,752 A * | 10/1973 | Saunders | ....................... | 292/264 |
| 4,337,972 A * | 7/1982 | Gill | ................................. | 292/67 |
| 4,627,249 A * | 12/1986 | Dumortier | ...................... | 70/139 |
| 4,884,833 A * | 12/1989 | Pedersen | ....................... | 292/316 |
| 4,997,101 A * | 3/1991 | King et al. | ..................... | 220/318 |
| 5,107,400 A * | 4/1992 | Kobayashi | ............... | 361/679.37 |
| 5,357,185 A * | 10/1994 | Chen | ............................. | 320/110 |
| 5,438,801 A * | 8/1995 | Ishihara et al. | ................. | 49/357 |
| 5,662,369 A * | 9/1997 | Tsuge | .............................. | 296/66 |
| 6,093,039 A * | 7/2000 | Lord | .............................. | 439/155 |
| 6,182,169 B1 * | 1/2001 | Force et al. | ...................... | 710/62 |
| 6,199,839 B1 * | 3/2001 | Rienzo | .......................... | 267/136 |
| 6,697,252 B2 * | 2/2004 | Maeda | ..................... | 361/679.41 |
| 6,704,194 B2 * | 3/2004 | Koo | ........................ | 361/679.27 |
| 7,050,295 B2 * | 5/2006 | Kang | ........................ | 361/679.58 |
| 7,103,698 B2 * | 9/2006 | Zhang et al. | ................... | 710/303 |
| 7,513,542 B2 * | 4/2009 | Schumm | ....................... | 292/163 |
| 7,675,746 B2 * | 3/2010 | Crooijmans et al. | ..... | 361/679.41 |
| 7,815,227 B2 * | 10/2010 | Jan et al. | .......................... | 292/27 |
| 7,841,632 B2 * | 11/2010 | Tracy et al. | ................... | 292/163 |
| 7,914,055 B2 * | 3/2011 | Yoshinaka | .................... | 292/306 |
| 2003/0011972 A1 * | 1/2003 | Koo | ............................... | 361/681 |
| 2003/0041206 A1 * | 2/2003 | Dickie | ........................... | 710/303 |
| 2004/0239127 A1 * | 12/2004 | Lodwick, Jr. | ................... | 292/251 |
| 2005/0285410 A1 * | 12/2005 | Doncov et al. | ................ | 292/201 |
| 2006/0279919 A1 * | 12/2006 | Wang | ............................. | 361/683 |
| 2007/0195495 A1 * | 8/2007 | Kim et al. | ...................... | 361/681 |
| 2009/0059485 A1 * | 3/2009 | Lynch et al. | ............. | 361/679.01 |
| 2010/0195279 A1 * | 8/2010 | Michael | .................... | 361/679.41 |
| 2011/0109104 A1 * | 5/2011 | Prasad | ........................... | 292/220 |

* cited by examiner

*Primary Examiner* — Thomas Beach
*Assistant Examiner* — Faria Ahmad
(74) *Attorney, Agent, or Firm* — Rabin & Berdo, P.C.

(57) ABSTRACT

A push-push type latch mechanism is disclosed, which includes a platform, a slide hook with an incline disposed on the platform, a spring disposed on the platform and connected to the slide hook, and at least one damping component disposed on the platform and touching the slide hook. An electronic device with the push-push type latch mechanism is also disclosed.

10 Claims, 8 Drawing Sheets

ELECTRONIC DEVICE WITH PUSH-PUSH TYPE LATCH MECHANISM

RELATED APPLICATIONS

This application claims priority to Taiwan Application Serial Number 98213734, filed Jul. 27, 2009, which is herein incorporated by reference.

BACKGROUND

1. Field of Invention

The present invention relates to a latch mechanism. More particularly, the present invention relates to a push-push type latch mechanism.

2. Description of Related Art

Eject type latch mechanisms are widely used in electronic devices to detachably assemble the electronic device and an assembly thereof. One such latch mechanism is a push-push type latch mechanism which latches the assembly while pushing the assembly with the push-push type latch mechanism for the first time, and ejects the assembly from the electronic device while pushing the assembly with the push-push type latch mechanism for the second time.

A conventional push-push type of a latch structure has a spring and a pushed block. The pushed block can be pushed to move along a stroke, and the spring is disposed in the way of the stroke. When the pushed block is pushed to move in the direction of the stroke to latch an assembly, the spring is compressed to store an elastic force. Then, after the pushed block is pushed again to release the spring to eject the assembly, the pushed block is pushed back to an original location by the elastic force of the compressed spring.

However, since the spring is disposed in the direction of the stroke of the pushed block, room at least for the spring is preserved in the pushed block's stroke. Thus, the length of the stroke of the pushed block cannot be decreased, and the size of the latch structure cannot be improved in effect.

SUMMARY

An embodiment of the invention provides a push-push type latch mechanism, which includes a platform, a slide hook with an incline disposed on the platform, a spring disposed on the platform and connected to the slide hook, and at least one damping component disposed on the platform and touching the slide hook.

Another embodiment of the invention provides an electronic device with the push-push type latch mechanism. The electronic device includes a platform disposed in the electronic device, a slide hook disposed on the platform and comprising an incline, a spring disposed on the platform and connected to the slide hook, two damping components disposed on opposite sides of the slide hook and touching the slide hook, two spiral springs disposed on the electronic device, and a substrate hung by the spiral springs. A gap is provided between the spiral springs and the platform.

Another embodiment of the invention provides the electronic device with the push-push type latch mechanism. The electronic device includes a platform disposed in the electronic device, a first slide hook disposed on the platform and with an incline, a second slide hook disposed on the platform and with an incline, a spring disposed on the platform, a first damping component and a second component disposed on the platform, two spiral springs disposed on the electronic device, and a substrate. An end of the spring is connected to the first slide hook, and another end of the spring is connected to the second slide hook. The first damping component is disposed at a side of the first slide hook and touches the first slide hook. The second damping component is disposed on a side of the second slide hook and touches the second slide hook. The spiral springs are disposed on the electronic device, and gaps are provided between the spiral springs and the platform respectively. The substrate is hung by the spiral springs.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

In the following descriptions of this specification, an electronic device which is mentioned below can be a hand held electronic apparatus, such as a Personal Digital Assistant (PDA), electronic translator, Notebook (NB), mobile phone or the like. Also, "push-push type" latch mechanism in the invention can be named as "push-lock and push-release type", "push-lock and push-open type", or "alternate type" of latch mechanism.

Figure 1A:
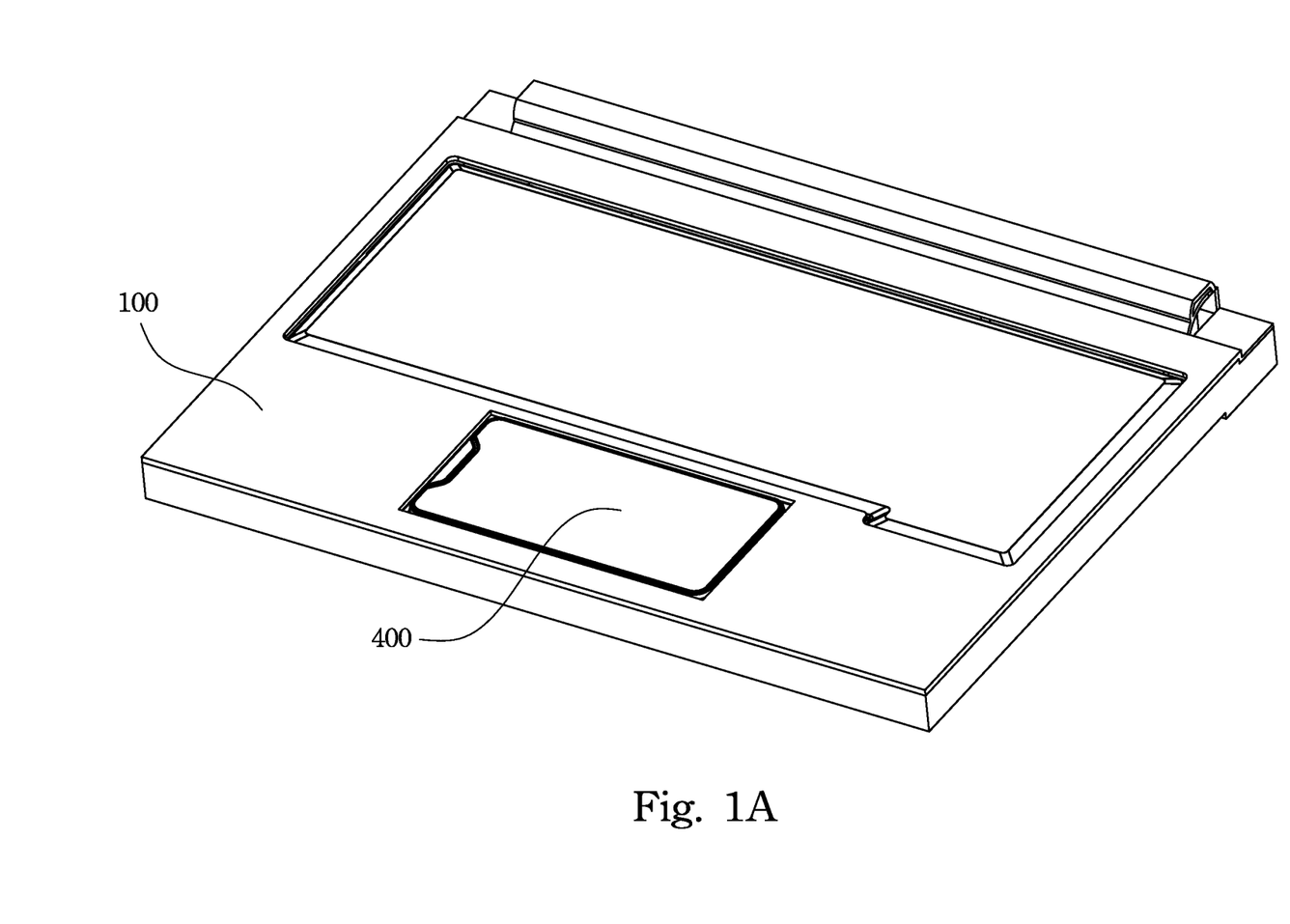
FIG. 1A and FIG. 1B illustrate schematic diagrams of different states of an embodiment of the electronic device with the push-push type latch mechanism of the invention.
Figure 1B:
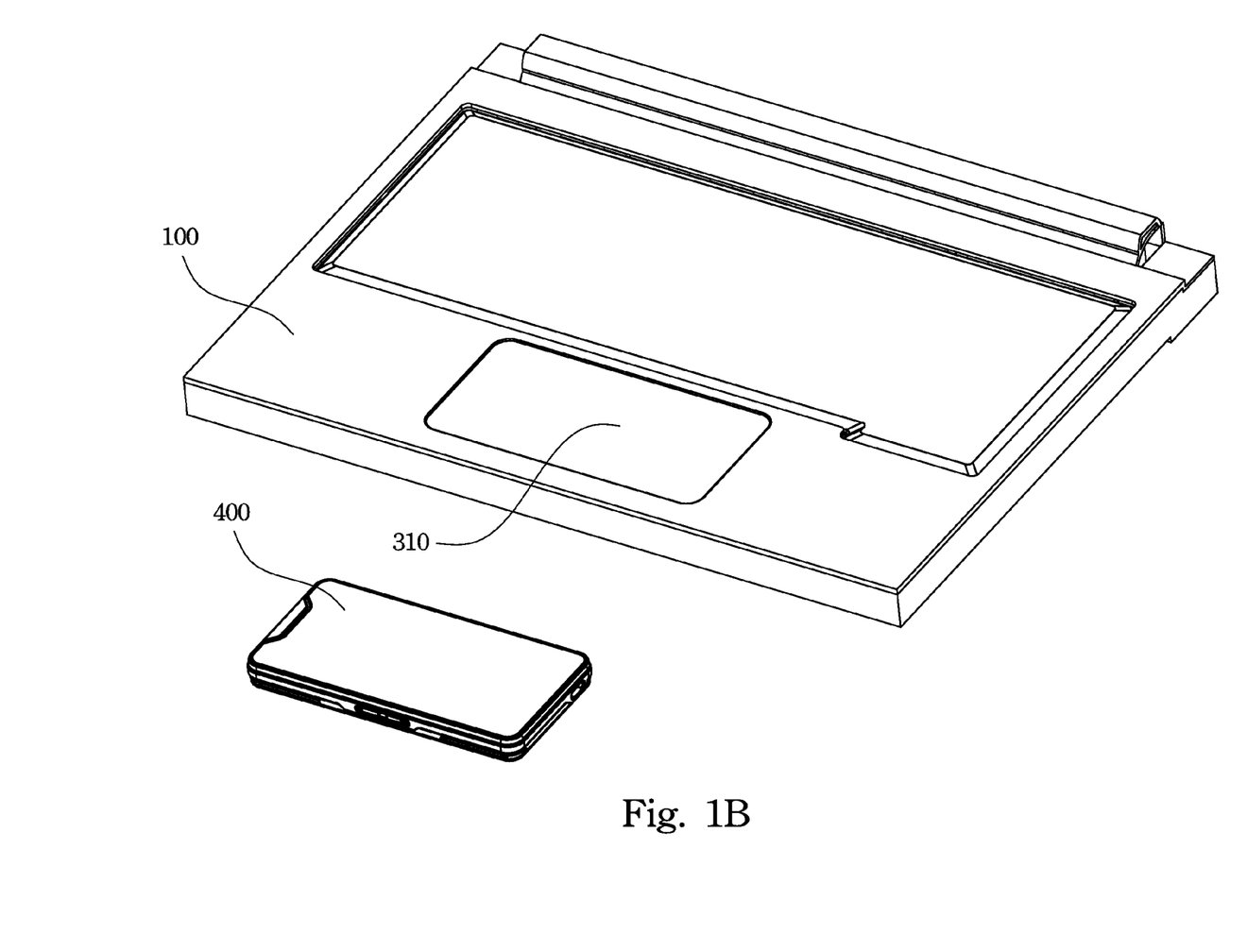

Refer to FIG. 1A and FIG. 1B simultaneously. FIG. 1A and FIG. 1B illustrate schematic diagrams of different states of an embodiment of the electronic device with the push-push type latch mechanism of the invention. The electronic device 100 includes an assembly 400. The assembly 400 is placed on the substrate 310 of the push-push type latch mechanism. The assembly 400 and the substrate 310 are pushed and sunk into the electronic device 100, and the assembly 400 is assembled to the electronic device 100, as shown in FIG. 1A. Then the assembly 400 in the electronic device 100 can be pushed once again, so that the assembly 400 is ejected from the electronic device 100 by the push-push type latch mechanism with the substrate 310, as shown as FIG. 1B.

The assembly 400 in this embodiment can be a handheld electronic device, such as a mobile phone or a Mobile Internet Device (MID). In another embodiment, the assembly 400 can be a pointing device, such as a touch pad. The assembly 400 is assembled to the electronic device 100 with the push-push type latch mechanism to operate the electronic device 100.

Figure 2:
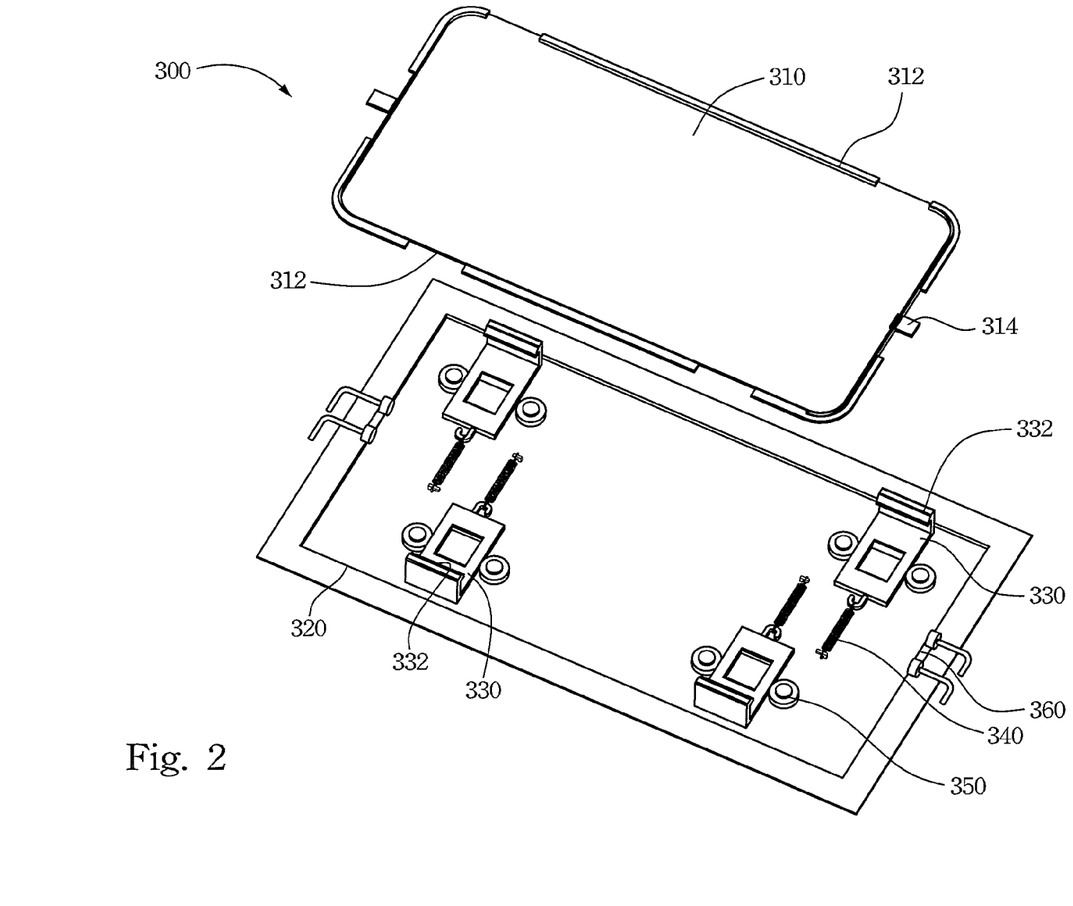
FIG. 2 illustrates a schematic diagram of an embodiment of the push-push type latch mechanism of the invention.

Refer to FIG. 2. FIG. 2 illustrates a schematic diagram of an embodiment of the push-push type latch mechanism of the invention. The push-push type latch mechanism 300 is utilized in the electronic device 100, which is shown in FIG. 1A. The push-push type latch mechanism 300 includes the substrate 310 for supporting the assembly 400 illustrated in FIG. 1A, a platform 320 disposed beneath the substrate 310, plural slide hooks 330 disposed on the platform 320, plural springs 340 for connecting the slide hooks 330 and the platform 320, plural damping devices 350 disposed on opposite sides of the slide hooks 330, and two spiral springs 360 disposed on the electronic device 100.

Each slide hook 330 has an incline 332. The substrate 310 has a flange 312 corresponding to the inclines 332. The flange 312 of the substrate 310 touches and pushes the incline 332 to force the slide hooks 330 to slide outward when the substrate 310 is pushed toward the platform 320. An end of the spring 340 is fixed on the platform 320, and another end of the spring 340 is connected to the slide hook 330 to provide an elastic force for returning the slide hook 330 back.

In this embodiment, two spiral springs 360 are disposed on a fixed part of the electronic device (i.e. the spiral springs are fixed). The spiral springs 360 are disposed at opposite sides of the substrate 310. A predetermined gap between the spiral springs 360 and the platform 320 is provided for accommodating the substrate 310, so the gap have to be larger than the press stroke of the substrate 310 when the substrate 310 is pushed.

The spiral spring 360 can be a constant force spring. The damping component 350 can be a friction wheel, a friction gear, a damping gear, etc. The damping component 350 in this embodiment is the friction wheel. The pair of damping components 350 are disposed on opposite sides of the slide hook 330 and touch the slide hook 330.

The substrate 310 has two protrusions 314. The protrusions 314 are disposed on opposite sides of the substrate 310. The protrusions 314 are placed on the spiral springs 360, and the substrate 310 is hung by the spiral springs 360. The spiral springs 360 are pressed by the protrusions 314 of the substrate 310, thus to generate an elastic force when the substrate 310 is pushed toward the platform 320. Then the spiral springs 360 could provide the elastic force to raise the protrusions 314 of the substrate 310 when the substrate 310 is released, and the substrate 310 is returned back to the state shown in FIG. 1B.

Figure 3A:
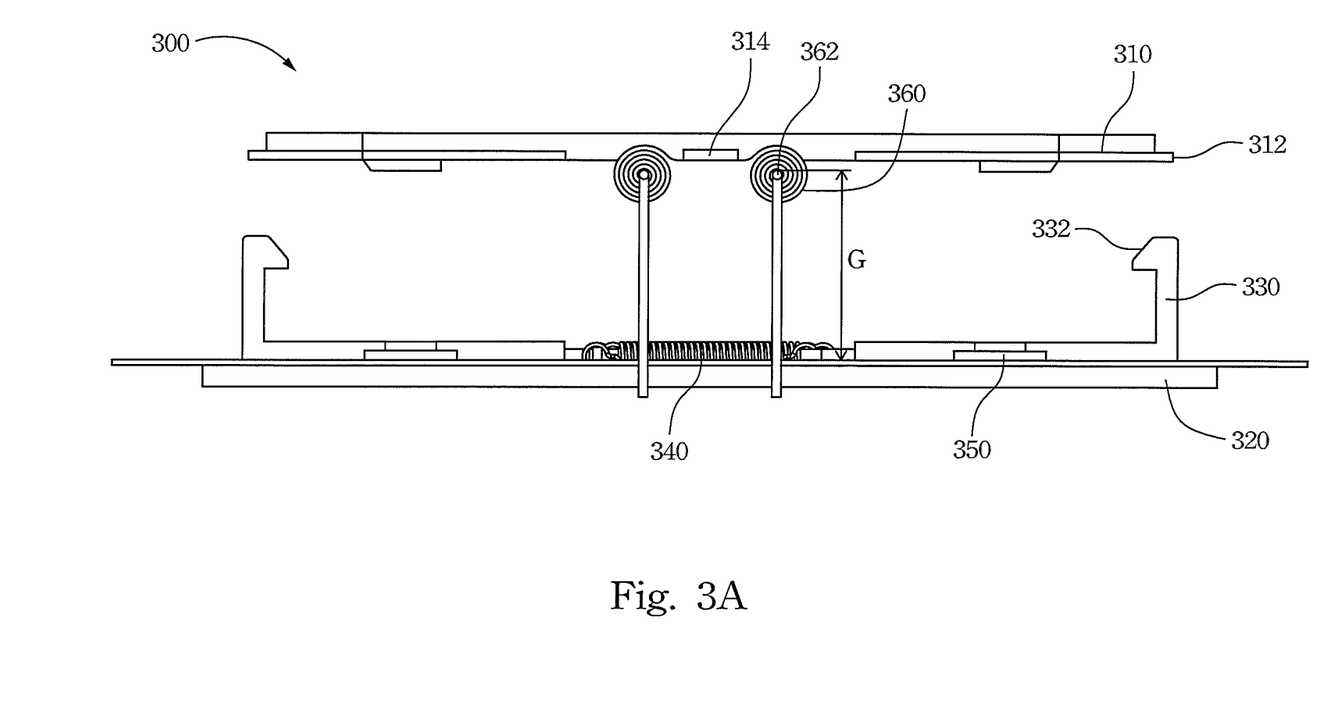
FIG. 3A to FIG. 3D illustrate schematic diagrams of different operation states of the push-push type latch mechanism in FIG. 2.
Figure 3B:
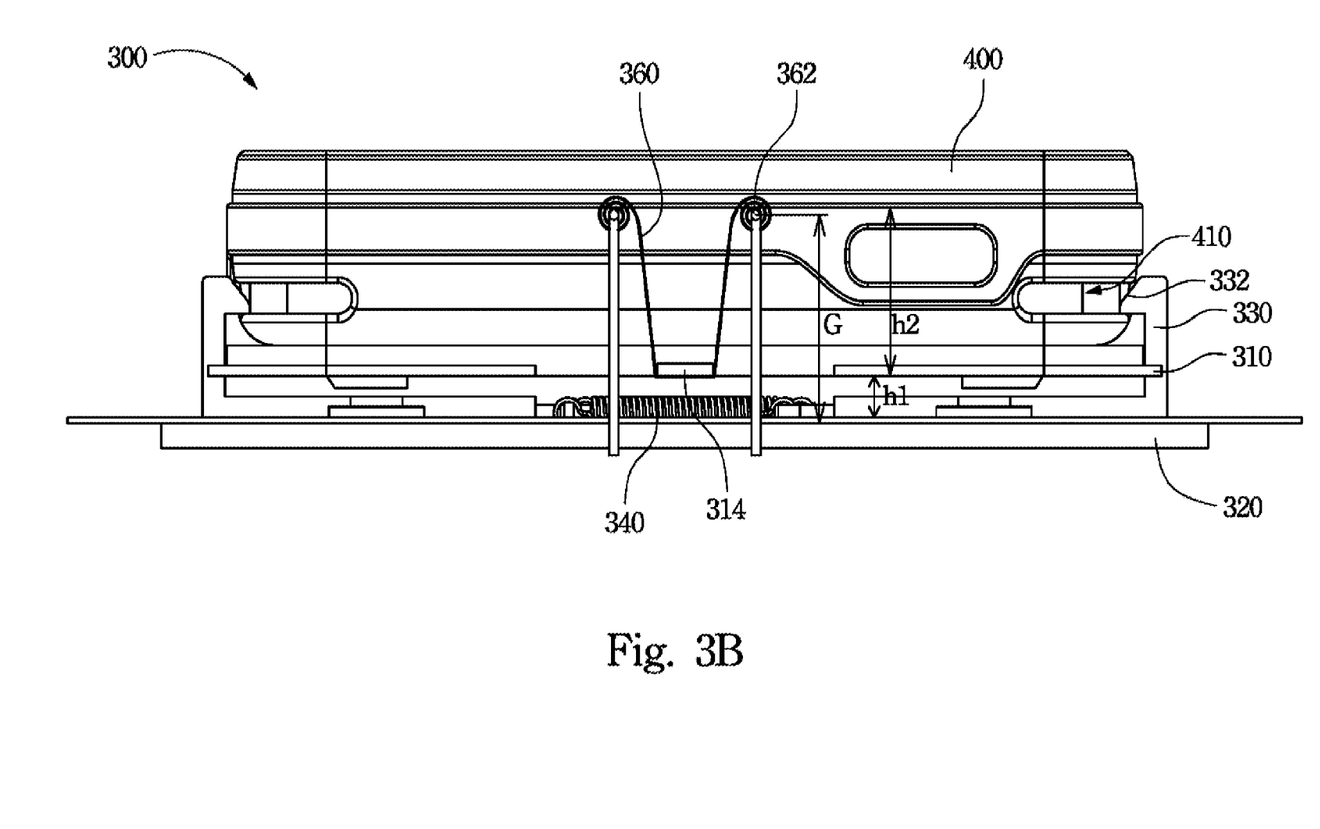

Refer to FIG. 3A to FIG. 3D. FIG. 3A to FIG. 3D illustrate schematic diagrams of different operation states of the push-push type latch mechanism in FIG. 2. In the first state of FIG. 3A, the push-push type latch mechanism 300 includes the substrate 310 for supporting the assembly 400 (as shown in FIG. 3B), the platform 320 disposed in the electronic device 100 (as shown in FIG. 1A), the slide hooks 330 disposed on the platform 320, the springs 340 for connecting the slide hooks 330 and the platform 320, the damping components 350 disposed on opposite sides of the slide hooks 330, and the spiral springs 360 disposed on the electronic device 100. Each spiral spring 360 has a fixed end 362 fixed on the electronic device. The protrusions 314 of the substrate 310 are hanged by the spiral springs 360 in the first state. The predetermined gap G between the fixed end 362 of the spiral springs 360 and the platform 320 is provided for accommodating the substrate 310 while being pushed.

In the second state of FIG. 3B, the assembly 400 is placed on the substrate 310, and the assembly 400 and the substrate 310 are pushed for the first time. More particularly, the substrate 310 is pushed in a pressing direction, and the spiral springs 360 are elongated in the pressing direction and in the respective gaps G when the substrate 310 is pressed in the pressing direction. The gap G consists of a buffer stroke h1 and a press stroke h2. The substrate 310 is moved in the press stroke h2 when the substrate 310 is pressed for the first time. The assembly 400 has a groove 410 disposed at the side surface of the assembly 400. Each slide hook 330 has the incline 332. The flange 312 of the substrate 310 touches and pushes the incline 332 of the slide hooks 330 when the assembly 400 and the substrate 310 are pushed toward the platform 320, so that the slide hooks 330 are pushed and slid outward, and the assembly 400 is placed between the slide hooks 330. Then the slide hooks 330 are returned by the elastic force provided by the springs 340, and the slide hooks 330 are coupled to the groove 410 of the assembly 400 to latch the assembly 400 at the second state.

The slide hooks 330 are coupled to the groove 410 of the assembly 400 to latch the assembly 400 when the assembly 400 is pushed for the first time. In the meantime, the spiral springs 360 are extended, which in turn generates an elastic force, by pressing the protrusions 314 of the substrate 310, wherein the press stroke of the substrate 310 is smaller than the predetermined gap, so that a buffer stroke $h_1$ is formed between the substrate 310 and the platform 320 in the second state.

Figure 3C:
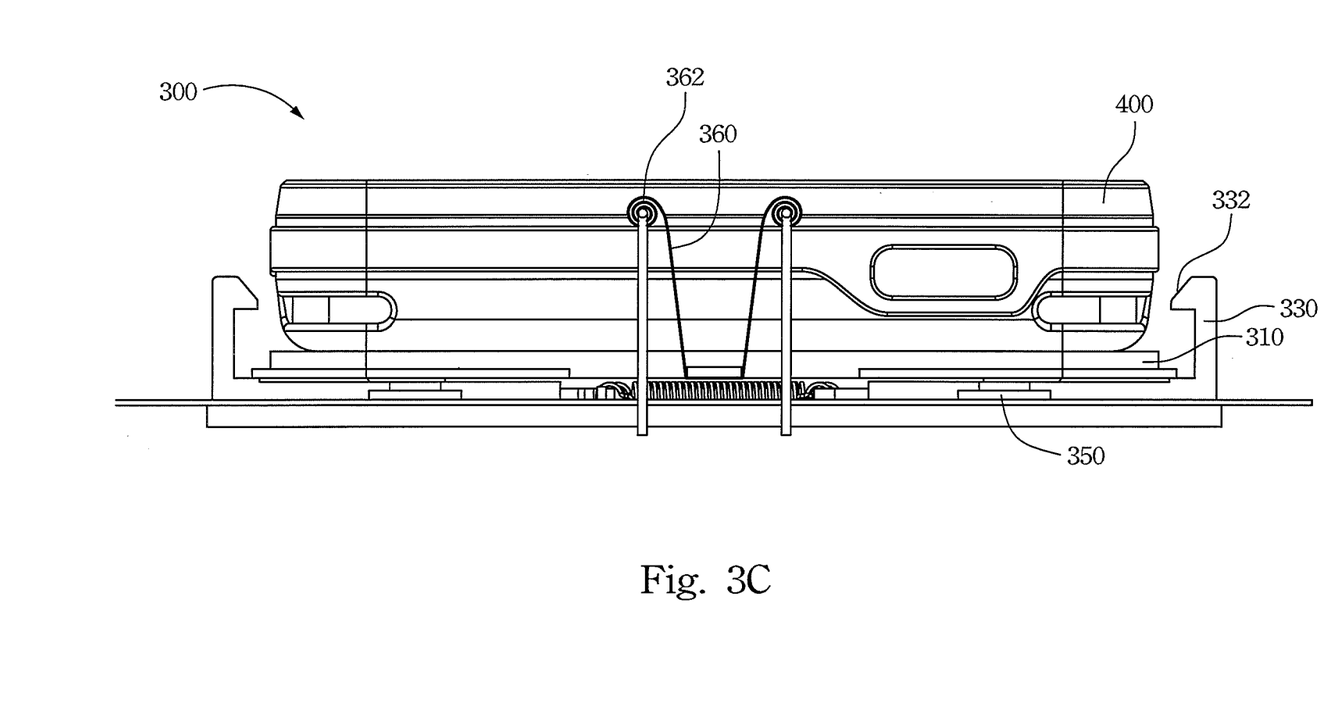

In the third state of FIG. 3C, the assembly 400 and the substrate 310 are pushed for the second time in order to release the substrate 310, and the assembly 400 and the substrate 410 are moved in the buffer stroke h1, which is shown in FIG. 3B. The assembly 400 further pushes the incline 332 of the slide hooks 330, so that the slide hooks 330 can be pushed outward and released from the assembly 400. The damping components 350 disposed touching the slide hooks 330 to generate a frictional force between the damping components 350 and the slide hooks 330 so as to slow down the slide hooks 330 to return back, thus providing enough time to raise the substrate 310 and the assembly 400 thereon. The force to raise the substrate 310 and the assembly 400 thereon is provided by the elastic force of the spiral springs 360.

Figure 3D:
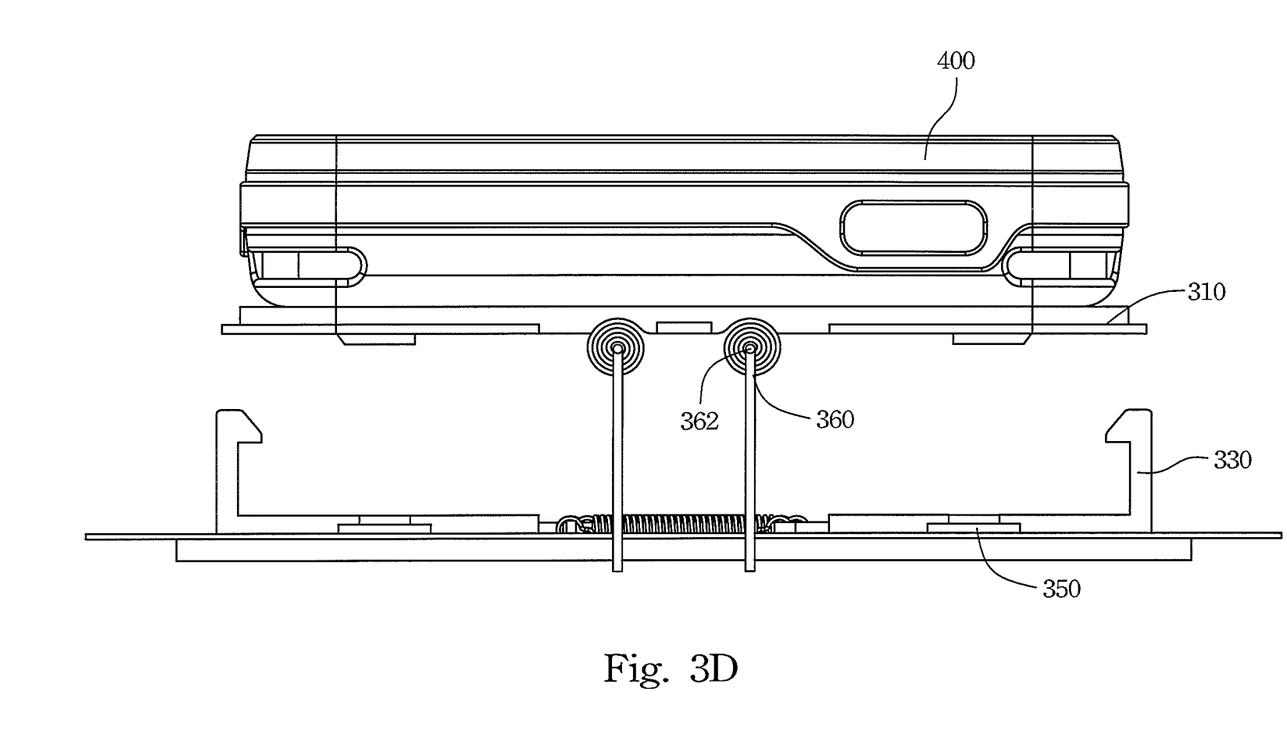

In the fourth state of FIG. 3D, the slide hooks 330 are pulled and slid by the springs 340 slowly because of the frictional force provided by the damping components 350. The substrate 310 and the assembly 400 thereon are raised to the surface of the electronic device 100 by the spiral springs 360 during this period. Namely, the substrate 310 and the assembly 400 thereon are raised is by the elastic force provided by the spiral springs 360, and the assembly 400 is ejected from the electronic device 100 after the assembly 400 is pushed for the second time.

Figure 4:
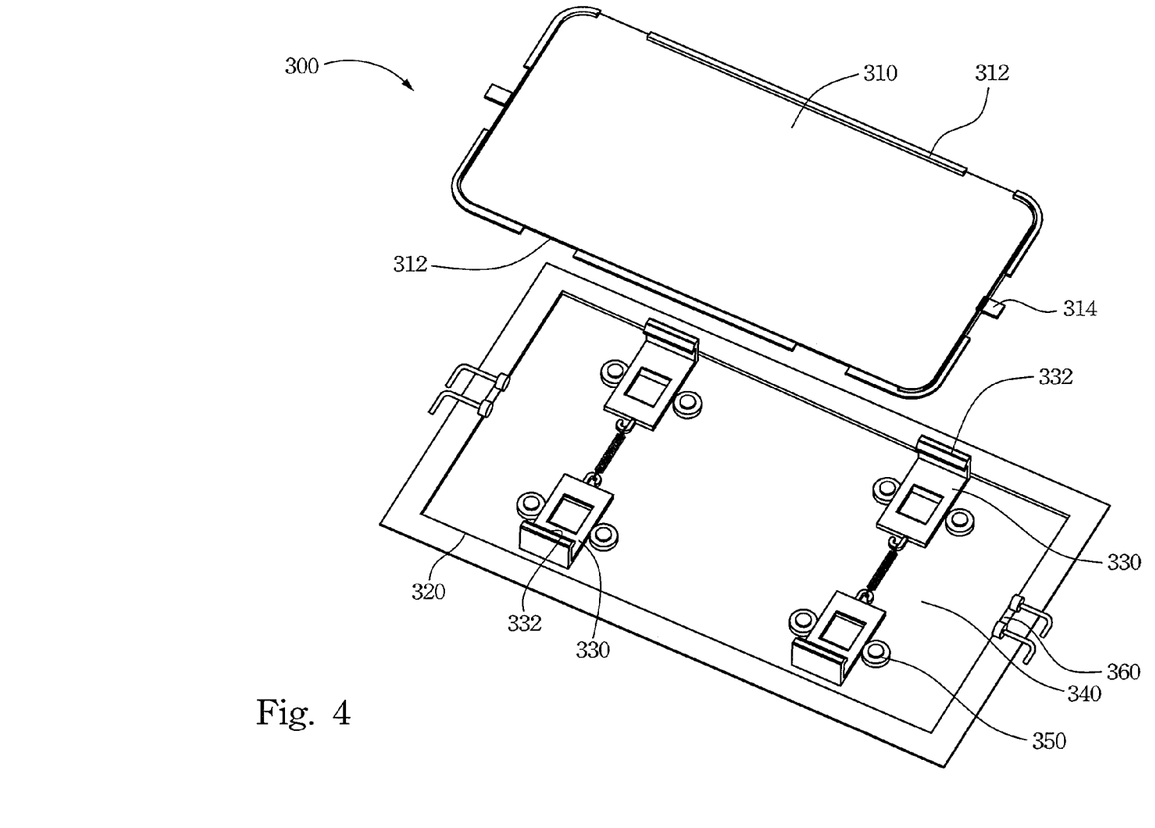
FIG. 4 illustrates a schematic diagram of another embodiment of the push-push type latch mechanism of the invention.

In another embodiment, shown in FIG. 4, the slide hooks 330 in pair could share one spring 340, i.e. the two ends of the spring 340 are connected to the pair of slide hooks 330 respectively. For example, a spring could be disposed on the platform with an end connected to the first slide hook and another end of the spring connected to the second slide hook. Besides, a first damping component could be disposed at a side of the first slide hook and touches the first slide hook and a second damping component could be disposed on a side of the second slide hook and touches the second slide hook.

According to the previous description, the push-push type latch mechanism of the invention could latch the assembly in the electronic device when the assembly is pushed for the first time, and then the assembly could be ejected from the electronic device when the assembly is pushed for the second time. Besides, since the spring is not disposed in the direction of the stroke of the substrate 310, room for the spring does not to be preserved, thus thickness of the electronic device can be improved.

Although the present invention has been described in considerable detail with reference to certain embodiments thereof, other embodiments are possible. Therefore, the spirit and scope of the appended claims should no be limited to the description of the embodiments contained herein.

It will be apparent to those skilled in the art that various modifications and variations can be made to the structure of the present invention without departing from the scope or spirit of the invention. In view of the foregoing, it is is intended that the present invention cover modifications and variations of this invention provided they fall within the scope of the following claims and their equivalents.

What is claimed is:

1. An electronic device with a push-push type latch mechanism, the electronic device comprising:
    a platform disposed in the electronic device;
    a slide hook disposed on the platform and comprising an incline;
    a spring disposed on the platform and connected to the slide hook;
    two damping components disposed on opposite sides of the slide hook and touching the slide hook for reducing the speed of the slide hook by the friction force between the damping components and the slide hook;
    two spiral springs, each spiral spring having a fixed end fixed on the electronic device, wherein gaps are provided between the fixed ends of the spiral springs and the platform respectively; and
    a substrate for supporting an assembly, the spiral springs being disposed on opposite sides of the substrate, the substrate comprising two protrusions placed on the spiral springs respectively, whereby the substrate touches and pushes the incline of the slide hook for sliding the slide hook outwardly as the substrate is pushed in a pressing direction, and the assembly is coupled to the slide hook when the slide hook returns, and the substrate touches and pushes the incline of the slide hook again for sliding the slide hook outwardly to release the assembly, such that the substrate is moved upwardly and downwardly in a stroke defined by the gaps,
    wherein the spiral springs are elongated in the pressing direction and in the respective gaps when the substrate is pressed in the pressing direction.

2. The electronic device with the push-push type latch mechanism of claim 1, wherein the damping components are damping gears.

3. The electronic device with the push-push type latch mechanism of claim 1, wherein the damping components are friction wheels or friction gears.

4. The electronic device with the push-push type latch mechanism of claim 1, wherein an end of the spring is fixed on the platform, and another end of the spring is connected to the slide hook.

5. The electronic device with the push-push type latch mechanism of claim 1, wherein the assembly comprises a groove for being coupled to the slide hook, the groove being disposed on a side surface of the assembly.

6. The electronic device with the push-push type latch mechanism of claim 5, wherein the assembly is a mobile phone.

7. The electronic device with the push-push type latch mechanism of claim 6, wherein the electronic device is a notebook computer.

8. An electronic device with a push-push type latch mechanism, the electronic device comprising:
    a platform disposed in the electronic device;
    a first slide hook disposed on the platform and comprises an incline;
    a second slide hook disposed on the platform and comprises an incline;
    a spring disposed on the platform, wherein an end of the spring is connected to the first slide hook, and another end of the spring is connected to the second slide hook;
    a first damping component disposed on the platform, wherein the first damping component is disposed at a side of the first slide hook and touches the first slide hook for reducing the speed of the first slide hook by the friction force between the first damping component and the first slide hook;
    a second damping component disposed on the platform, wherein the second damping component is disposed on a side of the second slide hook and touches the second slide hook for reducing the speed of the second slide hook by the friction force between the second damping component and the second slide hook;
    two spiral springs, each spiral spring having a fixed end fixed on the electronic device, wherein gaps are provided between the spiral springs and the platform respectively; and
    a substrate for supporting an assembly, the spiral springs being disposed on opposite sides of the substrate, the substrate comprising two protrusions placed on the spiral springs respectively, whereby the substrate touches and pushes the inclines for sliding the first and second slide hooks outwardly as the substrate is pressed in a pressing direction, and the assembly is coupled to the first and second slide hooks when the first and second slide hooks returns, and the substrate touches and pushes the inclines again for sliding the first and second slide hooks outwardly to release the assembly, such that the substrate is moved upwardly and downwardly in a stroke defined by the gaps,
    wherein the spiral springs are elongated in the pressing direction and in the respective gaps when the substrate is pressed in the pressing direction.

9. The electronic device with the push-push type latch mechanism of claim 1, wherein the gap consists of a press stroke and a buffer stroke.

10. The electronic device with the push-push type latch mechanism of claim 8, wherein the gap consists of a press stroke and a buffer stroke.

* * * * *